(12) United States Patent
Bade et al.

(10) Patent No.: US 9,180,404 B2
(45) Date of Patent: Nov. 10, 2015

(54) METHOD FOR MIST CONTROL

(75) Inventors: Otto Morten Bade, Stabekk (NO);
Simon Woodhouse, Strømmen (NO);
Oddvar Gorset, Roa (NO); Vibeke Andersson, Stabekk (NO)

(73) Assignee: Aker Engineering & Technology AS, Lysaker (NO)

( * ) Notice: Subject to any disclaimer, the term of this patent is extended or adjusted under 35 U.S.C. 154(b) by 0 days.

(21) Appl. No.: 14/128,368

(22) PCT Filed: Jul. 4, 2012

(86) PCT No.: PCT/EP2012/062997
§ 371 (c)(1),
(2), (4) Date: Dec. 20, 2013

(87) PCT Pub. No.: WO2013/004731
PCT Pub. Date: Jan. 10, 2013

(65) Prior Publication Data
US 2014/0116251 A1 May 1, 2014

(30) Foreign Application Priority Data
Jul. 5, 2011 (NO) .................................... 20110974

(51) Int. Cl.
*B01D 53/14* (2006.01)
*B01D 53/62* (2006.01)

(52) U.S. Cl.
CPC ............ *B01D 53/1475* (2013.01); *B01D 53/62* (2013.01); *B01D 2252/204* (2013.01); *Y02C 10/06* (2013.01)

(58) Field of Classification Search
None
See application file for complete search history.

(56) References Cited

U.S. PATENT DOCUMENTS 3,435,590 A    4/1969  Smith
5,318,758 A *  6/1994  Fujii et al. ..................... 423/228
(Continued)

FOREIGN PATENT DOCUMENTS

EP    0502596 A1   9/1992
EP    2335802 A2   6/2011
(Continued)

OTHER PUBLICATIONS

Persichini, Carolo, International Search Report, prepared for PCT/EP2012/062997, as mailed Nov. 2, 2012, 4 pages.
(Continued)

*Primary Examiner* — Duane Smith
*Assistant Examiner* — Phillip Shao
(74) *Attorney, Agent, or Firm* — Winstead PC

(57) ABSTRACT

A method for capturing $CO_2$ from a $CO_2$ containing gas (1), such as en exhaust gas from a thermal power plant fired on carbonaceous fuel, or any other $CO_2$ containing industrial gas, where $CO_2$ is captured from the gas by causing the gas to flow counter current to a $CO_2$ absorbing solvent introduced into a $CO_2$ absorption section (3) in an absorber (2) so that $CO_2$ present in the gas is absorbed by the $CO_2$ absorbing solvent to form a $CO_2$ rich solvent (5), where $CO_2$ rich solvent is collected on the bottom of the of the absorption column and withdrawn for regeneration, and where the treated exhaust gas (8) is released to the atmosphere after being subjected to one or more washing step(s) (6,7), wherein the temperature of the $CO_2$ absorbing solvent (4) introduced into the $CO_2$ absorption section has a temperature that is less than 5° C. lower than the maximum temperature in the absorption section of the absorber, is described.

5 Claims, 5 Drawing Sheets

(56) References Cited

U.S. PATENT DOCUMENTS

| | | | |
|---|---|---|---|
| 5,378,442 A * | 1/1995 | Fujii et al. | 423/228 |
| 5,832,712 A * | 11/1998 | Rønning et al. | 60/783 |
| 5,904,908 A * | 5/1999 | Suzuki et al. | 423/228 |
| 2003/0045756 A1 | 3/2003 | Mimura et al. | |
| 2010/0107875 A1* | 5/2010 | Koss et al. | 95/223 |
| 2011/0048239 A1* | 3/2011 | Gal et al. | 96/235 |
| 2011/0052453 A1* | 3/2011 | McLarnon et al. | 422/170 |
| 2011/0135550 A1* | 6/2011 | Nagayasu et al. | 423/230 |
| 2011/0308389 A1* | 12/2011 | Graff et al. | 95/166 |
| 2012/0180521 A1* | 7/2012 | Erickson | 62/617 |

FOREIGN PATENT DOCUMENTS

| | | |
|---|---|---|
| GB | 1195658 A | 6/1970 |
| WO | WO-2010102877 A1 | 9/2010 |

OTHER PUBLICATIONS

Fulk, Steven M., et al., "Aeroseol Mitigiation in Amine-Based CO2 Capture", 2nd Post Combustion Capture Conference, 2013, 3 pages.

* cited by examiner

METHOD FOR MIST CONTROL

TECHNICAL FIELD

The present invention relates to reduction of emission of amines and amine degradation products from amine based $CO_2$ absorbers. More specifically, the invention relates to the control of formation of mist containing amines and amine degradation products in absorbers.

BACKGROUND ART

A typical absorber for $CO_2$ is a tower where exhaust gas from which $CO_2$ is to be absorbed/removed, is brought in counter current contact with an aqueous $CO_2$ absorbent, such as an amine, in a contact zone. The contact zone normally comprises a CO2 absorption section to increase the contact surface between the absorbent and the gas.

Absorbent having absorbed $CO_2$ is collected below the contact zone, and exhaust gas reduced in $CO_2$ content is released from the top of the absorber.

An amine based CO2 absorber is normally equipped with one or more water wash section(s) above the $CO_2$-absorbing contact zone. The main objective of the water wash is to absorb amine vapour in order to minimise emission of amine to air. Another objective is to cool the gas and condense water in order to fulfil the requirement for water balance across the entire absorber. The condensation of water from the flue gas is a source for wash water makeup. Excess water in the water wash system is bled off and routed to the amine section below, and the effect of these make-up and bleed streams is reduced amine content in the water wash liquid.

One normally assumes close approach to equilibrium in the top of the water wash packed section with liquid recycling, meaning the gas will contain an amine partial pressure equivalent to the liquid amine vapour pressure, which again is dictated by the liquid temperature, amine concentration, $CO_2$ loading and pH. Hence a water wash operating at low temperature with high liquid replacement rate is preferred in order to minimise the amine slip to atmosphere, since lower temperature and lower amine concentration decreases amine vapour pressures.

EP 0502596 A (MITSUBISHI JUKOGYO KABUSHIKI) 09.09.1992 relates to an absorber for a $CO_2$ capture plant where the $CO_2$ lean exhaust gas is washed and cooled, and the temperature of the gas leaving the absorber is substantially equal to the gas introduced into the absorber. The washing is done to reduce amine emission. The temperature is controlled to avoid loss or building up of water in the plant.

US 2003045756 A (MIMURA TOMIO) 06.03.2003 relates to an absorber in a $CO_2$ capture plant wherein demisters are provided between absorption and washing sections and between washing sections to reduce amine emission. Additionally, amine vapour is removed from the gas by washing and cooling the gas.

Extensive emission measurements have been performed by the applicant on an operating pilot, treating flue gas from a coal fired boiler. Various $CO_2$ absorbing solvents have been tested, including 30wt % MEA. The pilot contains two water wash sections, where the upper section can be utilised as an acid wash in dedicated campaigns. An acid wash, as described in EP 2335802 A (MITUBISHI HEAVY INDUSTRIES, LTD.) 22.06.2011 and WO 2010/102877 A (AKER CLEAN CARBON AS) 16.09.2010 has proven effective at capturing gaseous phase alkaline compounds. FIG. 1 (Prior art) illustrates a simplified scheme of the pilot. Both online analysis (FTIR) and offline sampling of gas have been conducted.

There has surprisingly, under certain periods, been detected high emission of amine, even with operation of the acid wash in the absorber top that eliminates emission of ammonia and volatile alkyl amines. The amine emission could not be explained by the water wash vapour-liquid equilibrium assumption. It is discovered that this emission is in the form of mist, and that the more hydrophilic compounds such as MEA tends to be highly accumulated in the mist. The FTIR gas analyser samples and evaporates the mist in the heated sampling line (working at 180° C.), and hence measures the total amine content as vapour. It has been discovered that the mist precursors are ultrafine solids particles of fly ash, soot or salts in the flue gas entering the absorber.

Another test was performed at a smaller scale pilot, where the flue gas source is a propane burner. During normal operation, the emission from the pilot was not detectable by the FTIR. The burner was then manipulated to burn with excess fuel, resulting in high CO and soot formation. High amine emission and visible mist plume was observed, indicating soot particles acting as mist nucleation seeds.

These fine particles are initially acting as nucleates for water condensation in regions inside the absorber where water saturated gas is rapidly cooled. When formed, these mist droplets absorb amine from the surrounding gas phase. Emission measurements during campaigns with amine solvents such as MEA have proven that, in the absorber system with two water wash sections, the mist borne emission is the main contributor to overall amine emission. On the other hand, the emission of ammonia (which is a degradation product of amines such as MEA) is not related to the mist emission. This is ascribed the limited solubility of ammonia and hence limited accumulation in the mist droplets.

Mist with small droplet size, when formed, is very difficult to remove in wet scrubbers and conventional demisters. The mist droplets are in the size range of 0.1-10 µm diameter, and the mist forms a visible white plume from the top of the pilot absorber.

Mist elimination by fibre type demisters is known from other industries. The superficial velocity through such demisters has to be very low and the pressure drop is high, making this type of demisters less attractable for large gas volume applications like power plant flue gas cleaning. Wet electrostatic precipitator (ESP) is also proven efficient for removing mist and fine dust, but has high investment and operating cost.

The applicant has experienced that formation of mist may also be reduced by removing or reducing the content of fine and ultrafine particles from the incoming gas before introduction of exhaust gas into the $CO_2$ absorber. Conventional processes for removal of fine and superfine particles, such as ESP and wet flue gas desulphurization (FGD) have limited efficiency in capturing particles in the sub-micron range. As for removal or reduction of mist, wet ESP may be used to reduce or remove the sub-micron particles. As mentioned above, the investment and operating cost for wet ESP are high.

The solutions according to prior art is that they are not efficient in reducing mist following the gas that is washed.

The problem to be solved by the present invention is to eliminate or substantially reduce the release of amines or degradation products thereof from an amine based carbon capture plant. More specifically, the invention is directed to reduction of the release of amines caused by formation of mist that is released to the surroundings together with the $CO_2$ lean exhaust gas.

Accordingly, alternative solutions allowing reduction of the emission of mist, or droplets, and most specifically mist containing high concentration of amines or degradation products thereof, from the absorber of an amine based plant for $CO_2$ capture is therefore sought.

Disclosure of Invention

A method for capturing $CO_2$ from a $CO_2$ containing gas, such as en exhaust gas from a thermal power plant fired on carbonaceous fuel, or any other $CO_2$ containing industrial gas, where $CO_2$ is captured from the gas by causing the gas to flow counter current to a $CO_2$ absorbing solvent introduced into a CO2 absorption section in an absorber so that $CO_2$ present in the gas is absorbed by the $CO_2$ absorbing solvent to form a $CO_2$ rich solvent, where $CO_2$ rich solvent is collected at the bottom of the of the absorption column and withdrawn for regeneration, and where the treated exhaust gas is released to the atmosphere after being subjected to one or more washing step(s), wherein the temperature of the CO2 absorbing solvent introduced into the $CO_2$ absorption section has a temperature that is less than 5° C. lower than the maximum temperature in the absorption section of the absorber. Mist is generated primarily during cooling of a saturated gas mixture, and is most pronounced during rapid cooling of a saturated gas mixture that includes saturation nuclei. By avoiding cooling, or at least to avoid rapid cooling of the gas mixture streaming upwards in the absorption zone of the absorber the formation of mist formed in the absorption zone is avoided or substantially reduced. Any mist formed will have a composition reflecting the composition of the condensing fluids in the gas mixture. Accordingly, any mist formed in the absorption zone will have a high content of amines or degradation products thereof. Traditionally, the absorption section of the absorber is cooled by introduction of cold $CO_2$ solvent into the absorption zone. The temperature of the cold solvent is typically 30° C. or more, lower than the highest temperature in the absorption zone of the absorber, and the cooling is relatively abrupt at the top of the absorption zone. Reducing or even avoiding cooling of the content in the absorption zone results in a substantial reduction or avoidance of mist formation in the zone.

According to one embodiment, the temperature of the $CO_2$ solvent introduced into the $CO_2$ absorption section is substantially equal to or higher than the maximum temperature in the absorption section of the absorber. By introducing the solvent at a temperature as high as, or higher than the highest temperature in the absorption zone, no cooling occurs in the absorption zone so that no mist is formed therein.

According to one embodiment, the treated gas leaving the absorption zone is subjected to two or more downstream washing steps where the gas is washed in counter current flow to water and wherein the washing water introduced into the first washing step has a temperature that is equal to or higher than the wet bulb temperature of the flue gas that is introduced into the washing step, to avoid cooling the gas below the wet bulb temperature and thereby avoid mist formation in the first washing step.

According to one embodiment, the temperature of the absorber is controlled so that the lean absorbent is introduced into the top of the absorption section at a temperature from 60 to 85° C.

According to a specific embodiment, the temperature of the absorbent introduced into the absorption zone is between 70 and 80° C.

According to one embodiment, an acid wash section is located downstream of the washing steps in order to remove alkaline gaseous compounds such as volatile amines and ammonia, from the exhaust gas. Amines and the major degradation products thereof are basic species, and gaseous amines or degradation products thereof that is still present in the treated exhaust gas, is efficiently removed or substantially reduced by the acid wash.

DETAILED DESCRIPTION OF THE INVENTION

Figure 1:
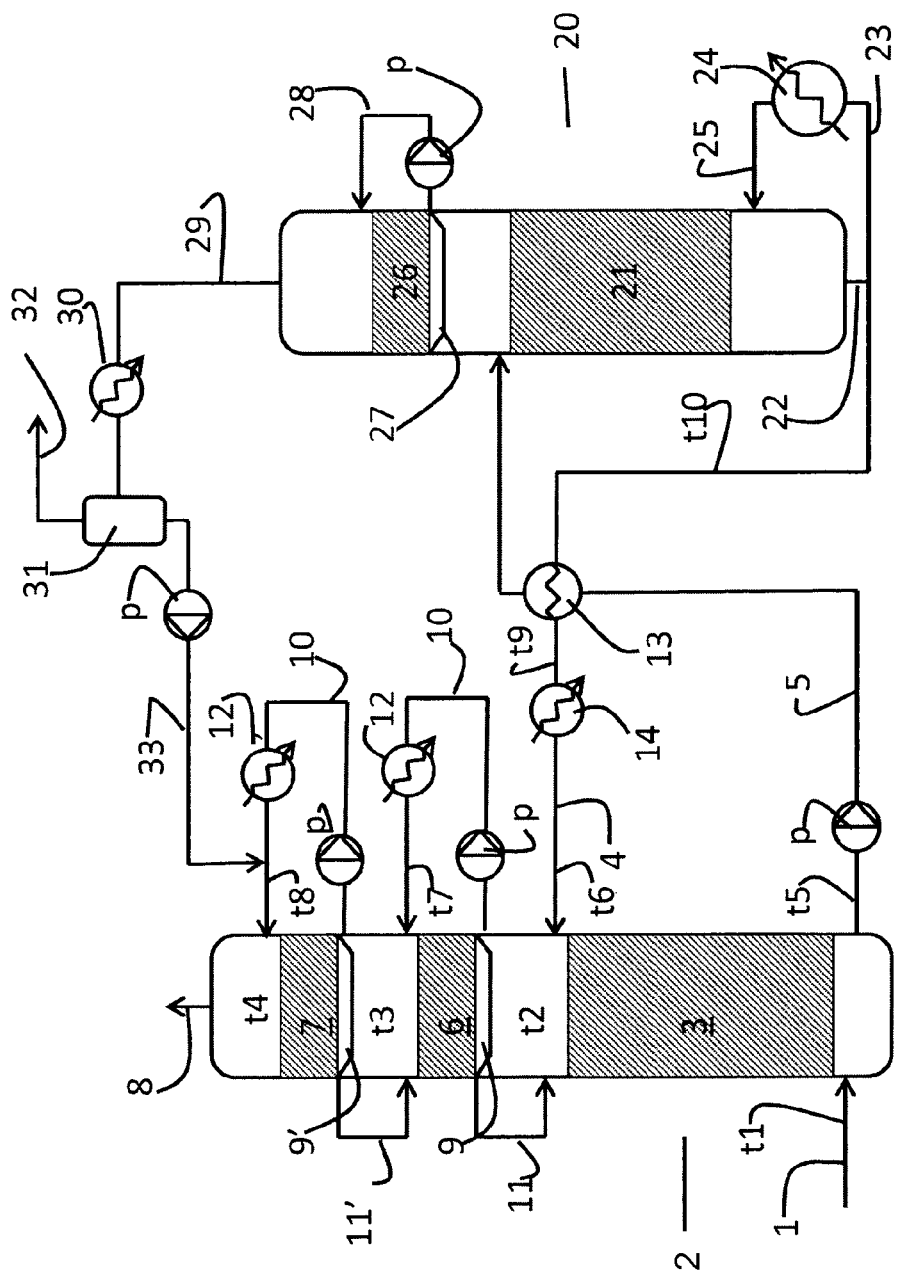
FIG. 1 is a principle sketch of a conventional carbon capture plant.

FIG. 1 illustrates a carbon capture plant according to the prior art. $CO_2$ containing gas, such as exhaust gas from a power plant fired with carbonaceous fuel is introduced through an exhaust gas inlet 1 into an absorber 2. In the absorber 2, the exhaust gas is caused to flow countercurrent to an aqueous absorbent in a CO2 absorption section 3. The aqueous absorbent, being an aqueous solution of one or more amine(s), is introduced at the top of the CO2 absorption section 3 through a lean absorbent line 4.

Rich absorbent, having absorbed $CO_2$, is collected at the bottom of the absorber and withdrawn through a rich absorbent line 5. The $CO_2$ depleted flue gas leaving the CO2 absorption section 3, is then washed in one or more washing zone(s) 6, 7 to cool the flue gas, and to remove or reduce the amount of amines and degradation products from the absorbents that are carried with the flue gas. The cooled and washed exhaust gas is thereafter withdrawn from the absorber through a $CO_2$ depleted flue gas line 8, and released into the atmosphere.

A collection tray 9, 9' is provided below each washing zone 6, 7 to collect the washing water for re-circulation through a washing water re-circulation line 10, 10', and for excess liquid to be bled off via a bleed line 11, 11' to the packing below, either the prior washing zone 6, or the contact zone 3. Washing water circulation coolers 12, 12'are provided in the re-circulation lines 10, 10' to cool the washing water.

$CO_2$ rich absorbent withdrawn through the rich absorbent line 5 is heated against lean absorbent in line 4 in a cross heat exchanger 13, before being introduced into a regeneration column 20 for desorbing $CO_2$ from the rich absorbent. The $CO_2$ rich absorbent is introduced into the regeneration column onto the top of a packing 21 and is caused to flow counter current to $CO_2$ and steam in the packing 21.

Regenerated absorbent is collected at the bottom of the regeneration column 20 and is withdrawn there from through a lean absorbent withdrawal line 22. The lean absorbent in line 22 is split into a reboiler line 23 that is introduced into a reboiler 24 where the $CO_2$ lean absorbent is heated to produce steam that is introduced into the regeneration column through a steam line 25, and a lean absorbent line 4 for recycling of the lean absorbent back to the absorber as described above.

The $CO_2$ lean absorbent in line 4 is cooled against rich absorbent in line 5 in the cross heat exchanger 13, and is further cooled in a cooler 14 before being introduced into the absorber 2.

$CO_2$ stripped off the absorbent together with steam, are washed by counter current flow to washing water in a washing zone 26 above the packing 21. The washing water is collected below the washing zone 26 in a collector 27 and recycled through a washing water recycle line 28.

Pumps, marked with p, are provided where necessary for circulation and/or increasing liquid pressure.

A mixture of $CO_2$ and steam are withdrawn from the regeneration column through a $CO_2$ line 29, cooled by means of a cooler 30, and condensed water is separated from the $CO_2$ in a stripper overhead receiver 31 before the $CO_2$ is withdrawn for further treatment through a $CO_2$ export line 32. The condensed water is withdrawn through a condensate line 33 and recirculated to a process in the plant were water i needed, as e.g. washing water for washing of the $CO_2$ lean flue gas before it is released into the surroundings.

The solvent reacts with $CO_2$ in the packed bed 3 and heat is released due to the exothermal reaction. A bell-shaped temperature profile (temperature bulge) is observed inside the CO2 absorption section 3, with a maximum temperature typically around 65-75 °C. A large amount of water is evaporated from the solvent, and the steam evolved follows the flue gas to the top of the absorption bed where it is cooled to some degree by the cold lean amine. The gas is further cooled in the water wash.

The present inventors have identified that mist is formed in water saturated gas containing nucleation seeds in areas characterised by steep temperature drop, or quenching. Avoiding areas where quenching occurs, or ascertain that quenching occurs only in areas with low partial pressure of amines or degradation products thereof, are therefore desired. Typical temperatures at different points of interest during operation of the carbon capture plant are indicated by t1 to t10.

Typical temperatures for a state of the art plant are indicated in table 1 below.

TABLE 1

| | t1 | t2 | t3 | t4 | t5 | t6 | t7 | t8 | t9 | t10 |
|---|---|---|---|---|---|---|---|---|---|---|
| Temp | 38 | 60 | 50 | 40 | 45 | 40 | 40 | 40 | 50 | 120 |

Table 1 clearly illustrates that the temperature of the exhaust gas is reduced (quenched) in the upper part of the CO2 absorption section 3 due to introduction of cooled (typically 40° C.) lean amine through line 4, and is further cooled in the washing sections 6 and 7 by introduction of cooled washing water. For each step comprising quenching mist, may be formed, especially if mist nucleation seeds are available in the gas.

The content of amines and degradation products thereof in the mist is strongly correlated with the vapour pressure of the amines and degradation products thereof at the site of mist formation. The partial pressure of amines and degradation products thereof is highest in the upper part of CO2 absorption section 3 of the absorber where water saturated gas flowing upwards in the CO2 absorption section is quenched by the incoming lean absorbent, which will result in formation of mist having a high concentration of amines and degradation products thereof.

The partial pressure of amines and degradation product thereof is still relatively high in the first washing zone 6, even though it is lower than in the CO2 absorption section 3. Hence mist formed in the washing zone 6 will also accumulate significant amounts of amine and degradation products thereof. The problem is, however, that mist droplets formed at one stage is not stopped by a later washing step or conventional demister.

This problem is, according to the present invention, solved by avoiding quenching of the gas streaming upwards in the absorber, or at least avoiding quenching of the gas in the contact zone 3 or the first washing zone 6.

FIGS. 2 to 6 are alternative ways of either substantially reducing the formation of mist having a high content of amines or degradation products thereof, to substantially reduce the release of amine or degradation products thereof to the surroundings. FIGS. 2 to 6 will only be described with regard to features or operating conditions that differ from the features or operating conditions of the above described prior art solution.

Figure 2:
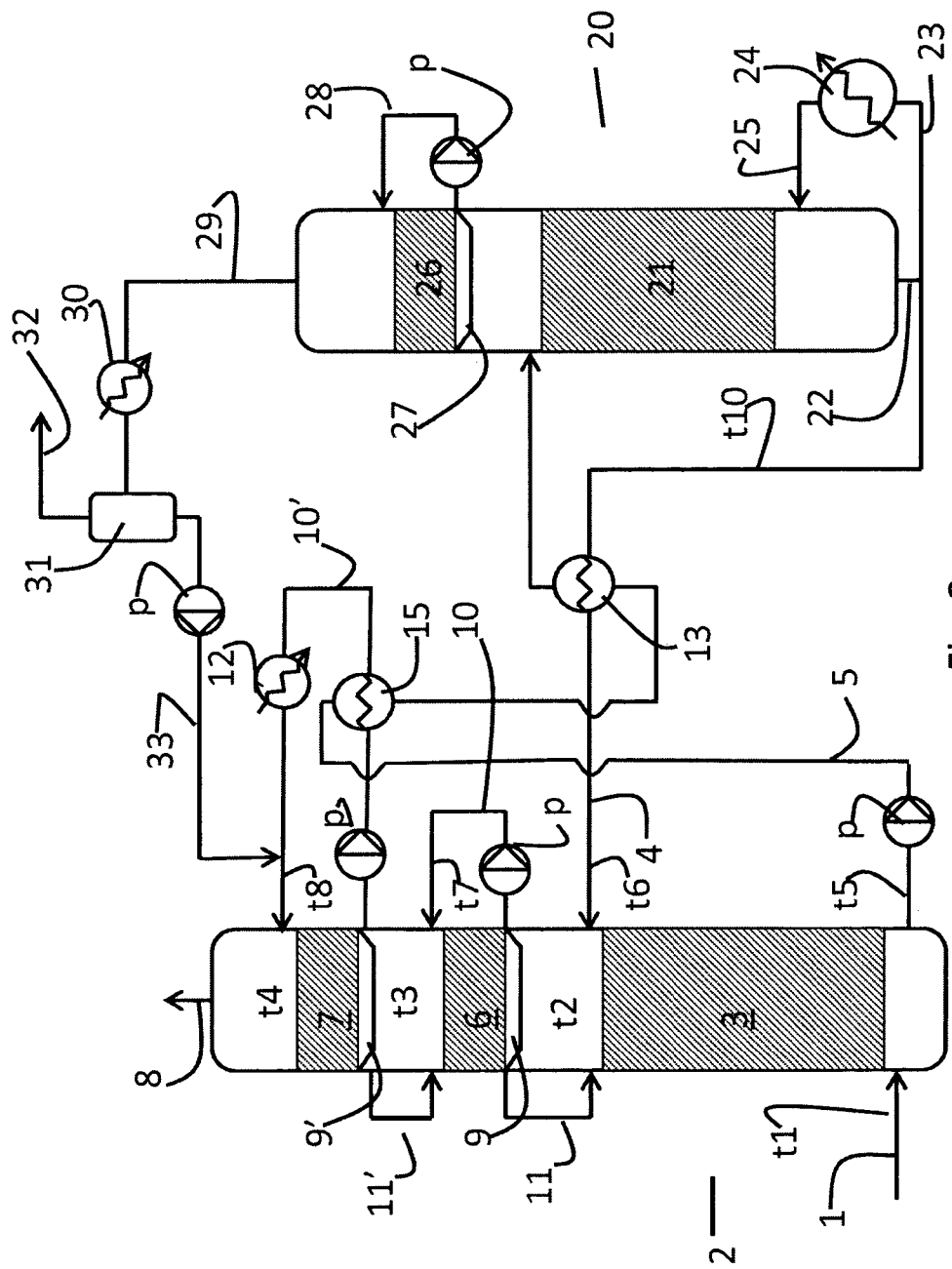
FIG. 2 is a principle sketch illustrating one embodiment of the present invention.

FIG. 2 illustrates a first embodiment of the present invention, where the lean absorbent cooler is removed and the lean absorbent is fed to the absorber at elevated temperature, typically from about 60 to 85° C., such as between 70 and 80° C. The water wash 6 is operated without external cooling, the objective is to avoid gas cooling and water condensation in the water wash section 6. To ascertain that no mist is formed in the water wash 6, the temperature in this first washing step has to be kept equal to or higher than the wet bulp temperature of the flue gas that enters into the first washing step. The wet bulp temperature being the temperature at which water starts to condense.

The rich absorbent being withdrawn through the rich absorbent line 5 is heat exchanged against the washing water in the second washing loop 10' in a heat exchanger 15 to cool the washing water and to preheat the rich amine. The rich amine is thereafter further heated in heat exchanger 13 as described with reference to FIG. 1.

The configuration according to FIG. 2 allows for regulation of the temperatures in the absorber to reduce or avoid quenching with corresponding risk for mist formation in the CO2 absorption section 3 and first washing section 6. Typical running temperatures of this embodiment are indicated in the table 2.

TABLE 2

| | t1 | t2 | t3 | t4 | t5 | t6 | t7 | t8 | T10 |
|---|---|---|---|---|---|---|---|---|---|
| Temp (° C.) | 38 | 75 | 75 | 40 | 45 | 75 | 75 | 40 | 120 |

It is apparent from table 2 that the temperature of the exhaust gas streaming upwards in the absorber increases or is kept substantially stable as the gas gets higher up in the absorber, until the second washing section 7, in which the gas is caused to flow counter current to cold washing water having a temperature of about 40° C., to result in a treated exhaust gas having a temperature of about 40° C., and hence maintain the overall water balance across the absorber.

By avoiding cooling of the exhaust gas streaming upwards in the absorber, super-saturation of the gas is avoided. Mist formation requires the combination of condensation nuclei and water super-saturated gas. Accordingly, no or only a small amount of mist is formed in the CO2 absorption section 3 and washing section 6, even if (sub)micron size particles are present in the gas. If the gas comprises condensation nuclei, e.g. in the form of (sub)micron sized particles, mist will most probably form in the second washing section. Mist formation in the second washing section will, however, not cause any environmental problems as the vapour pressure of amines and degradation products thereof in the gas in the second washing section is low. The concentration of amines and degradation products thereof in the mist formed here will therefore be negligible.

The skilled person will understand that the amount of amines and degradation products thereof may be even further reduced by introducing one or more water washing step(s) between the illustrated first and second washing step.

Figure 3:
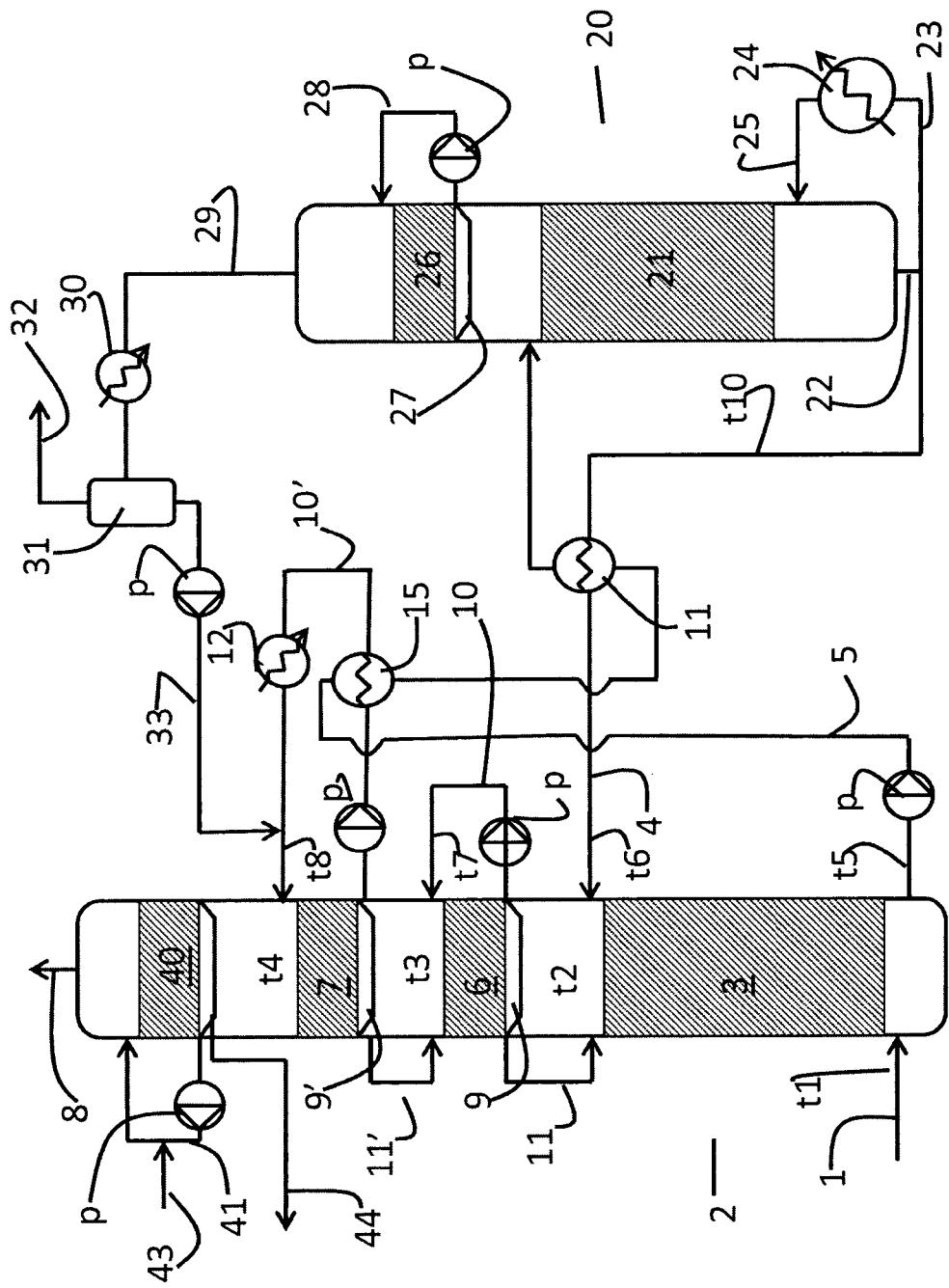
FIG. 3 is a principle sketch illustrating an alternative embodiment of the present invention.

FIG. 3 illustrates an alternative embodiment, that is also closely related to the embodiment of FIG. 2. The main difference being the introduction of an acid wash section 40 at the top of the absorber to remove or substantially reduce the content of gaseous alkaline species in the treated exhaust gas, such as amine, ammonia and other gaseous degradation products of amines.

The $CO_2$ exhausted exhaust gas leaving the second washing section is caused to flow counter current to an aqueous acid solution in an acid was section 40. The acid washing solution is recycled in an acid wash loop 41, by means of a pump p. A make-up line 43 is provided to make up for any loss of water, and to add acid to adjust the pH of the acid washing water. A bleed line 44 is provided to establish an acid wash bleed in order to maintain steady concentration of ammonium and amine salts in the acid wash recycle loop. The bleed is preferably routed to an amine reclaimer.

The acid wash is primarily added to ensure an improved removal of any gaseous alkaline species, such as e.g. ammonia, in the exhaust gas.

Table 3 illustrates typical temperatures for the embodiment according to FIG. 3.

TABLE 3

| | t1 | t2 | t3 | t4 | t5 | t6 | t7 | t8 | T10 |
|---|---|---|---|---|---|---|---|---|---|
| Temp | 38 | 75 | 75 | 40 | 45 | 75 | 75 | 40 | 120 |

The skilled person will understand that an acid washing may be added in any of the other alternative embodiments described herein to remove or substantially reduce any gaseous alkaline species present in the exiting treated exhaust gas.

Figure 4:
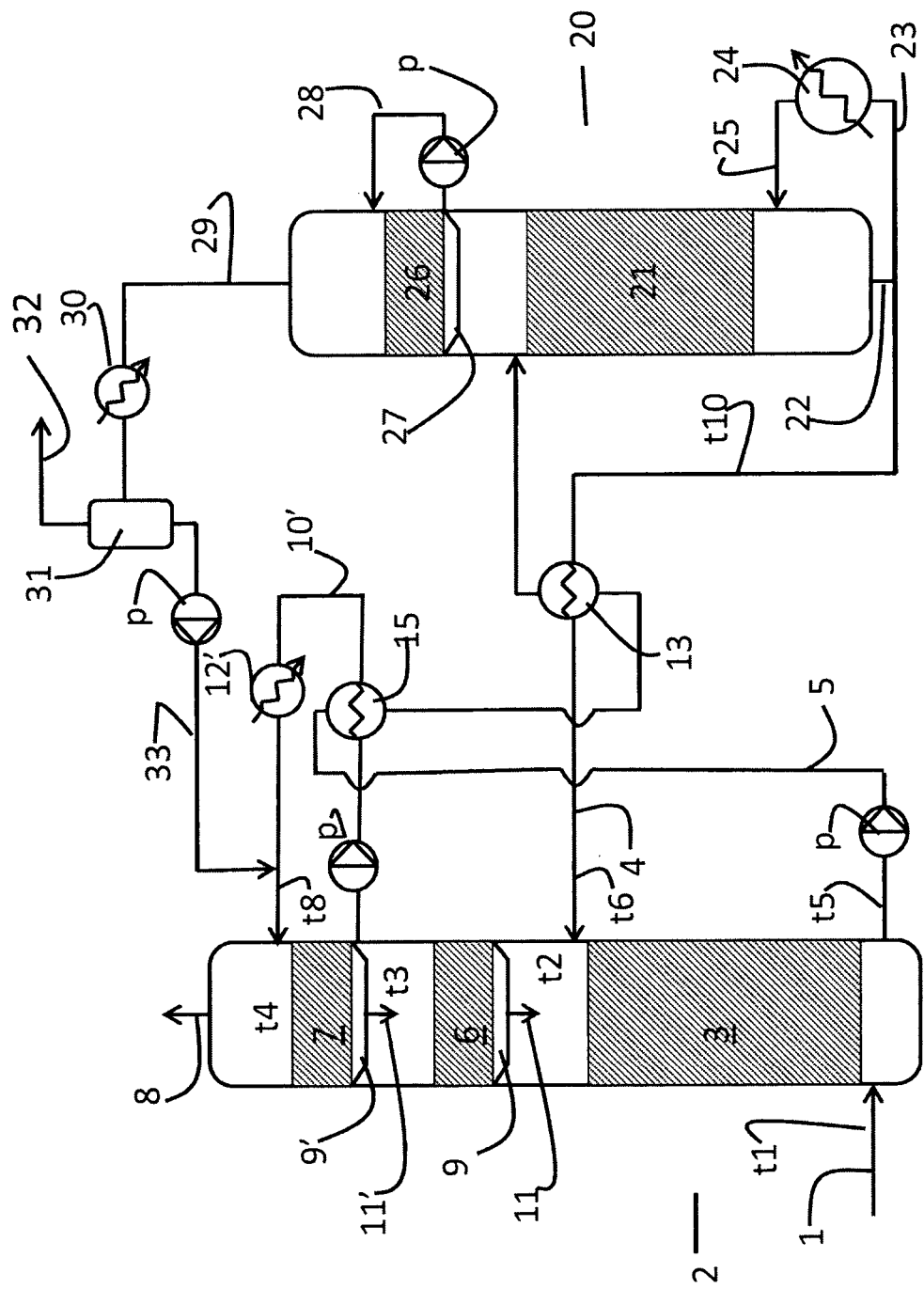
FIG. 4 is a principle sketch illustrating an alternative embodiment of the present invention.
Figure 5:
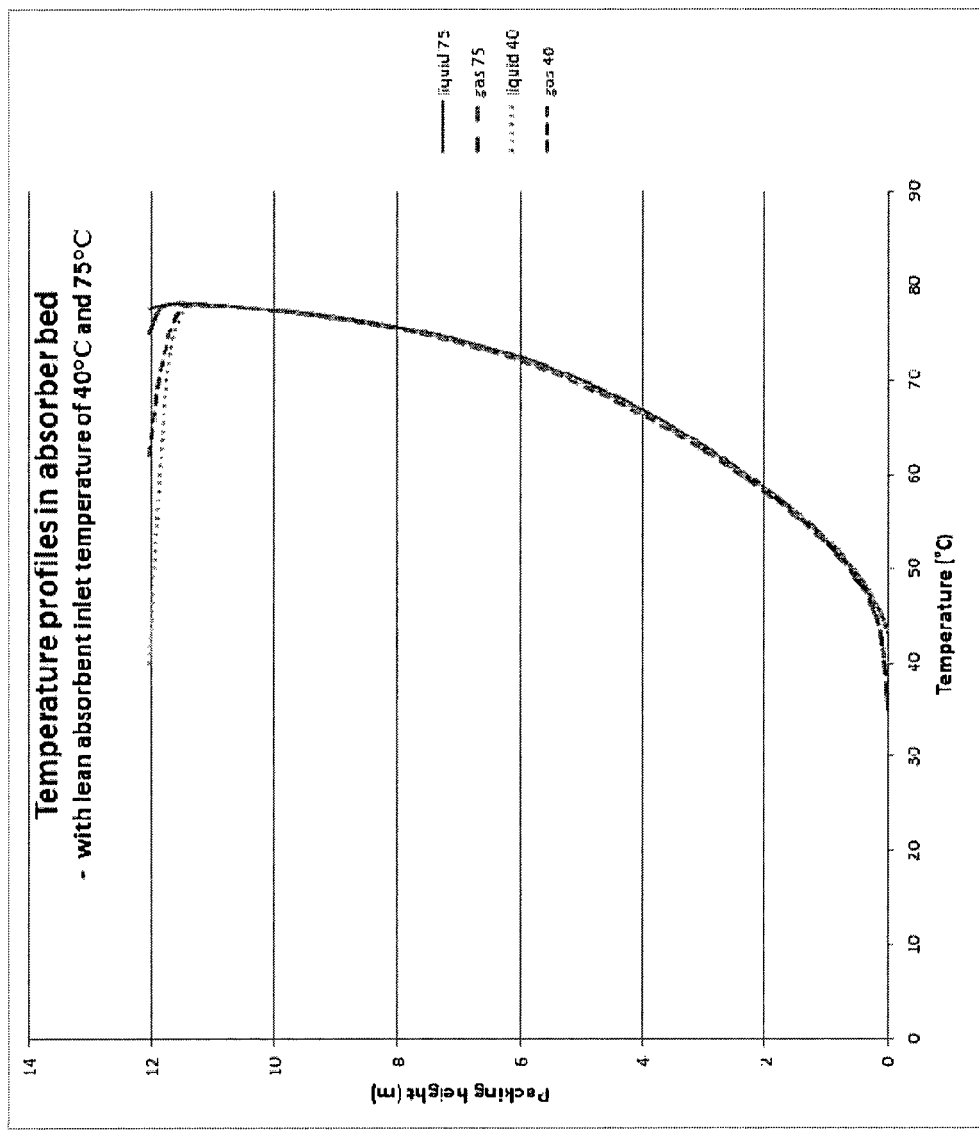
FIG. 5 illustrates simulated temperature profiles in a $CO_2$ absorption section in an absorber.

FIG. 4 relates to an alternative embodiment that is also closely related to the embodiment of FIG. 2. The temperature gradient through the absorber mainly corresponds to the temperature gradient for the embodiment of FIG. 2. The main difference between the embodiment of FIGS. 2 and 4, is that wash water recycle at the lower washing section is eliminated in the embodiment of FIG. 4.

The bleed lines 11, 11' are in FIG. 4 indicated by arrows, to indicate that a direct transfer of washing water from the collecting tray, or even directly from the washing packing as such, is possible. The high water condensation rate taking place in the upper water wash section 7 due to the cooling of the exhaust gas in this section, is sufficient to enable liquid once through operation of the lowest washing section. The liquid to gas ratio in the lowermost washing section 6 will be sufficient for wetting a proper structured packing.

Table 4 illustrates typical temperatures for the embodiment according to FIG. 4.

TABLE 4

| | t1 | t2 | t3 | t4 | t5 | t6 | t7 | t8 | T10 |
|---|---|---|---|---|---|---|---|---|---|
| Temp | 38 | 75 | 75 | 40 | 45 | 75 | NA | 40 | 120 |

The skilled person will understand that the exact configuration and presence of any bleed lines 11, 11' or a direct flow through are both possible alternatives.

The skilled person will understand that tray sieve or bubble bed arrangements are possible alternatives to packed bed arrangements for this application with once-through liquid flow.

Experiment

A pilot plant according to FIG. 2 was operated on 30 wt %. The flue gas into the absorber was water saturated with a temperature of 38° C., and contained 13 vol % $CO_2$. The reboiler was operated at 120° C. and 1.9 bara, resulting in a lean loading of 0.18 mol $CO_2$/mol MEA. Lean amine was fed at 75° C., and 90% removal efficiency was achieved in the packed absorption bed of 12 meter height. The lower water wash was maintained adiabatic, meaning no external cooling was applied. All flue gas cooling was applied on the upper water wash, in order to obtain an outlet gas temperature of 40° C. With an absorber inlet temperature of 38° C. and an absorber outlet temperature of 40° C., the overall absorber water balance is close to neutral.

Flue gas was extracted iso-kinetically from the zone below the lower water wash, between the two water wash sections and above the upper water wash section. The MEA emission measurements showed:
- 2060 mg/Nm³ above the amine section,
- 8 mg/Nm³ between the water wash sections
- below detection limit of 0,05 mg/Nm³ MEA above the upper water wash.

The lower wash absorbs up to 99% of the vapour phase amine, even if running warm at 75° C. The high removal rate is ascribed the high rate of liquid replacement and accordingly low amine concentration.

The impact of high lean amine feed temperature on the CO2 capture efficiency was investigated. The pilot was in stable operation with 90% capture efficiency and lean amine feed temperature of 40° C. Lean loading and solvent circulation was kept constant while lean loading temperature was increased to 75° C. No change in capture rate was observed. Hence operation with higher lean amine feed temperature does not seems to have a negative impact on the CO2 capture performance. Except from the very upper part of the absorption bed, the temperature profile in the absorber bed did not change significantly. However, as noted earlier, the MEA emission in the form of mist is sometimes high (several mg/Nm3) when running with lean amine feed temperature of 40° C.

A simulation calculation of temperature profiles in the absorber bed have been performed both on the prior art solution as illustrated in FIG. 1 and the first embodiment according to the present invention as illustrated in FIG. 2. The results from the simulation are given in FIG. 7.

As illustrated in FIG. 7, the temperature profile in the absorber of the embodiment of FIG. 2, is increasing from the bottom of the absorber CO2 absorption section 3 and upwards. The simulation confirm that introduction of hot, about 75° C., absorbent at the top of the absorber CO2 absorption section removes the conditions promoting formation of mist. Accordingly, it is assumed that operation of $CO_2$ capture plants according to the present invention will eliminate or substantially reduce the formation of amine containing mist in the absorber of the capture plant.

The temperature for introduction of the lean amine may vary depending on the characteristics of the absorber and CO2 absorption section and the absorbing solvent in question. The optimal temperature for introduction of the lean solvent may be found by simulating the temperature profile in the pacing device in question. The optimal temperature for the lean solvent is here the maximum temperature in the CO2 absorption section according to the simulation, or slightly below said maximum temperature. It is assumed the a slight temperature drop of e.g. <5° C., such as <3° C., of preferably <2° C., may be allowed without resulting in mist formation.

The expression that the temperature increases in the direction of the gas flow, or that the temperature is substantially constant, is therefore intended to include situations were a small temperature variation, or temperature drop, may occur.

The invention claimed is:

1. A method for capturing $CO_2$ from a $CO_2$ containing gas, the method comprising:
    capturing $CO_2$ from the $CO_2$ containing gas by causing the $CO_2$ containing gas to flow upwards counter current to an aqueous amine solvent flowing once-through downwards in a $CO_2$ absorption section in an absorber so that $CO_2$ present in the $CO_2$ containing gas is absorbed by the aqueous amine solvent to form a $CO_2$ rich solvent;
    wherein the $CO_2$ rich solvent is collected at a bottom of the absorber and withdrawn for regeneration;
    wherein a treated exhaust gas is released to an atmosphere after being subjected to one or more washing step(s) where the treated exhaust gas is washed in counter current flow to water; and
    wherein a temperature of the aqueous amine solvent introduced into the $CO_2$ absorption section is less than or equal to a maximum temperature in the absorption section and not more than 5° C. lower than the maximum temperature in the absorption section of the absorber, thereby reducing amine mist formation.

2. The method of claim 1, wherein the treated exhaust gas leaving the absorption section is subjected to two or more downstream washing steps where the treated exhaust gas is washed in counter current flow to water and wherein the water introduced into a first washing step has a temperature that is equal to or higher than a wet bulb temperature of a flue gas that is introduced into the washing step.

3. The method of claim 1, wherein the aqueous amine solvent is introduced into a top of the absorption section at a temperature from 60 to 85° C.

4. The method of claim 3, wherein the temperature of the aqueous amine solvent introduced into the absorption section is between 70 and 80° C.

5. The method of claim 1, wherein $CO_2$ exhausted exhaust gas leaving a second washing section is caused to flow countercurrent to an aqueous acid solution in an acid wash section in order to remove alkaline gaseous compounds such as volatile amines and ammonia, from the exhaust gas.

* * * * *